Dec. 16, 1930.  J. BURKHARDT  1,785,336
MOVING PICTURE FILM AND METHOD OF MAKING
Filed April 22, 1929
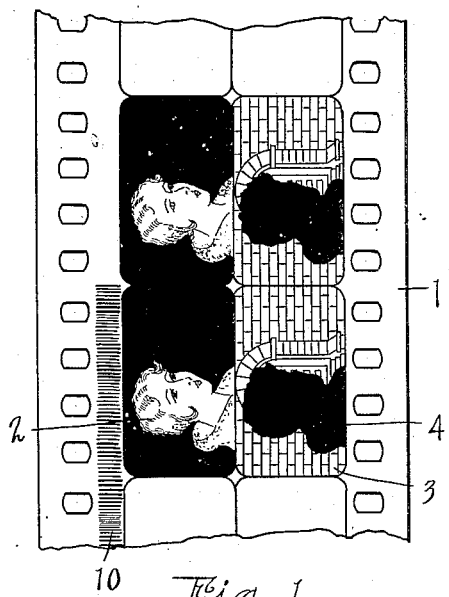
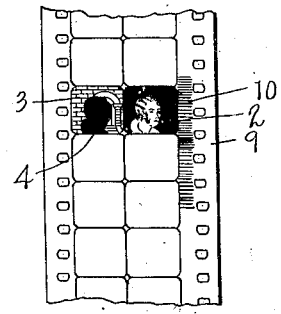
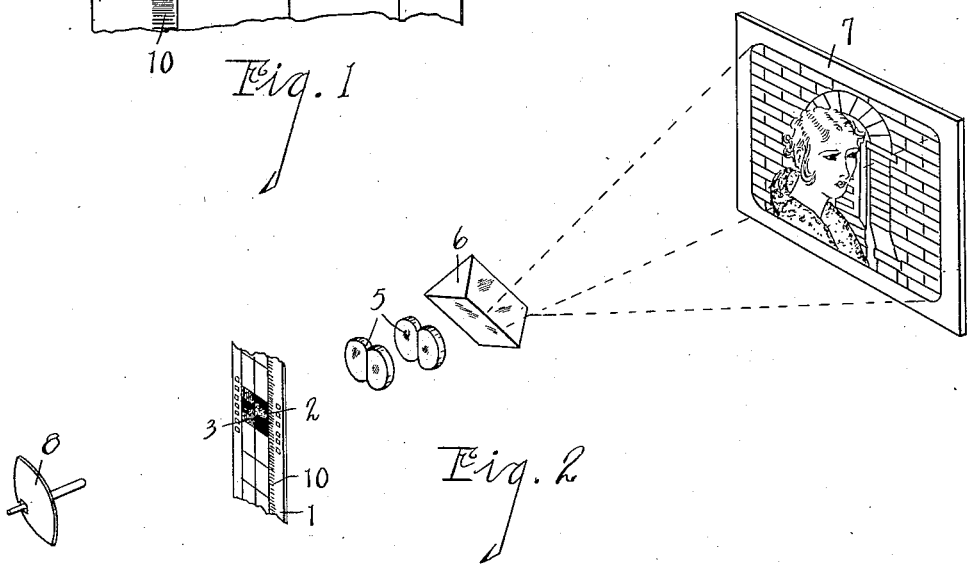
INVENTOR
Jacob Burkhardt
BY Chappell Earl
ATTORNEYS Patented Dec. 16, 1930

1,785,336

UNITED STATES PATENT OFFICE

JACOB BURKHARDT, OF DETROIT, MICHIGAN, ASSIGNOR TO THIRD DIMENSION PICTURES, INC., OF NEW YORK, N. Y., A CORPORATION OF NEW YORK

MOVING-PICTURE FILM AND METHOD OF MAKING

Application filed April 22, 1929. Serial No. 357,146.

The main objects of this invention are:

First, to provide a motion picture film for producing pictures having the appearance of relief or third dimension and also bearing a sound record synchronized with the pictures.

Second, to provide a film of this character from which the projected pictures are very sharp or clear and distinct.

Objects pertaining to details and economies of my invention will definitely appear from the description to follow. The invention is defined in the claims.

A structure illustrating the manner of carrying out my invention is clearly illustrated in the accompanying drawing, in which:

Fig. 1 is a fragmentary plan view of a moving picture film embodying the features of my invention.

Fig. 2 is a perspective view mainly in conventional form illustrating a suitable apparatus or equipment for projecting pictures from the film.

Fig. 3 is a fragmentary plan view of a slightly modified form or embodiment of my improvements.

In the embodiment illustrated in Fig. 1 the film designated generally by the numeral 1 is provided with a series of foreground pictures 2, preferably action or image pictures, and a series of background pictures 3 suitable as backgrounds for the foreground or action pictures. The foreground and background pictures are both miniatures, that is, they are reduced so that two or more of them may be arranged in the frame space of a standard film.

The pictures in the embodiment shown in Fig. 1 are disposed transversely of the film, the pictures of each pair being also disposed side by side transversely of the film.

Each background picture has a mask 4 thereon of the foreground or image picture of the pair, this mask being preferably a solid "black", as it is termed in the art, so that when a pair of pictures is projected in superimposed relation upon the screen the foreground picture will register with the foreground mask and the light of the background does not show through the foreground picture.

In projecting the pictures I employ projecting machines having double lenses indicated at 5 in Fig. 2, a refracting prism 6 being employed between the lenses and the screen indicated at 7 so that pictures are presented in upright position. The lamp is conventionally illustrated at 8, Fig. 2.

In the modification shown in Fig. 3 the pictures of each pair are disposed transversely of the film, the height of the pictures, however, being longitudinally disposed on the film. These are also miniature pictures reduced so that there are two pairs of pictures on each frame space of a standard film.

I also preferably provide the films with sound records indicated at 10.

By printing the pictures in minature and in pairs disposed transversely to the film I am able to employ films of standard width and secure stereoptican or third dimensional effects or illusions and also embody a sound record in the film to be reproduced in proper synchronism with the foreground or action pictures.

I have illustrated and described my improvements mainly in conventional form. I have not attempted to illustrate or describe other modifications or adaptations as it is believed that this disclosure will enable those skilled in the art to embody or adapt my improvements as may be desired.

Having thus described my invention what I claim as new and desire to secure by Letters Patent is:

1. A moving picture film comprising a series of background pictures and a series of image pictures both series being disposed longitudinally of the film and in coacting pairs side by side transversely of the film and both pictures being in miniature so that each pair of pictures occupies substantially a standard frame space of the film, each background picture having a mask of the foreground picture of the pair.

2. A motion picture film comprising a series of miniature background pictures and a series of miniature foreground pictures arranged in pairs side by side with the height of the pictures disposed transversely of the film, there being a pair of such miniature pictures in each film space corresponding to that of a standard picture space or frame, the background picture of each pair having thereon a mask of the foreground picture of the pair.

3. A motion picture film comprising a series of miniature background pictures and a series of miniature foreground pictures arranged in pairs side by side transversely of the film, there being a plurality of such miniature pictures in each film space corresponding to that of a standard picture space or frame, the background picture of each pair having thereon a mask of the foreground picture of the pair.

4. A motion picture film of standard width comprising a series of background pictures and a series of action pictures arranged in pairs and disposed transversely of the film, each background picture of each pair having a mask of the foreground picture of the pair.

5. A moving picture film comprising a series of background pictures and a series of foreground pictures both disposed in coacting pairs side by side transversely of the film and both pictures being in miniature, each background picture having a mask of the foreground picture of the pair.

6. A motion picture film comprising a series of miniature background pictures and a series of miniature foreground pictures disposed in pairs side by side transversely of the film, the background picture of each pair having thereon a mask of the foreground picture of the pair.

In witness whereof I have hereunto set my hand.

JACOB BURKHARDT.